United States Patent [19]

Enokimoto et al.

[11] Patent Number: 4,836,325
[45] Date of Patent: Jun. 6, 1989

[54] OFF-ROAD VEHICLE

[75] Inventors: Akito Enokimoto; Eiji Hosoya; Keiji Kasa; Akio Handa; Makoto Ishiwatari; Kousei Mizumoto, all of Saitama, Japan

[73] Assignee: Honda Giken Kogyo Kabushiki Kaisha, Tokyo, Japan

[21] Appl. No.: 112,817

[22] Filed: Oct. 23, 1987

[30] Foreign Application Priority Data

Oct. 23, 1986 [JP] Japan .................................. 61-253379
Oct. 23, 1986 [JP] Japan .................................. 61-253380
Oct. 23, 1986 [JP] Japan .................................. 61-253381

[51] Int. Cl.4 ............................................. B60K 26/00
[52] U.S. Cl. .................................. 180/333; 188/344; 188/350; 280/264
[58] Field of Search ................. 180/333; 280/264, 707; 188/344, 350

[56] References Cited

U.S. PATENT DOCUMENTS

| 532,298 | 1/1895 | Wallace | 188/344 |
| 4,421,359 | 12/1983 | Hayashi et al. | 188/344 |
| 4,641,854 | 2/1987 | Masuda et al. | 280/701 |

FOREIGN PATENT DOCUMENTS

| 51-104525 | 8/1976 | Japan . |
| 51-104532 | 8/1976 | Japan . |
| 51-109519 | 9/1976 | Japan . |
| 53-17532 | 5/1978 | Japan . |
| 56-56469 | 6/1981 | Japan . |
| 60-134042 | 9/1985 | Japan . |

Primary Examiner—Kenneth R. Rice
Attorney, Agent, or Firm—Irving M. Weiner; Joseph P. Carrier; Pamela S. Burt

[57] ABSTRACT

An off-road vehicle has a hydraulic brake operating assembly mounted on a steering handle. The steering handle has a base, a rectangular handle portion integral with the base, and a cover covering the base. The brake operating assembly has a brake oil reservoir, two brake levers pivotally supported on lateral sides of the handle portion for braking front and rear wheels, respectively, and two brake master cylinders communicating with the brake oil reservoir through hoses and responsive to operation of the brake levers for generating hydraulic pressure. The brake oil reservoir is centrally fixedly mounted on the rectangular handle portion. The brake master cylinders are fixedly mounted respectively on the lateral sides of the handle portion.

3 Claims, 5 Drawing Sheets

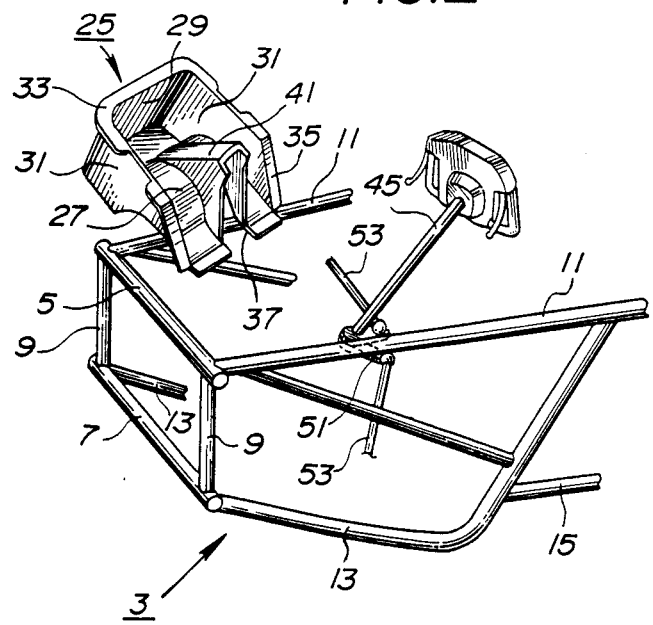
FIG. 2
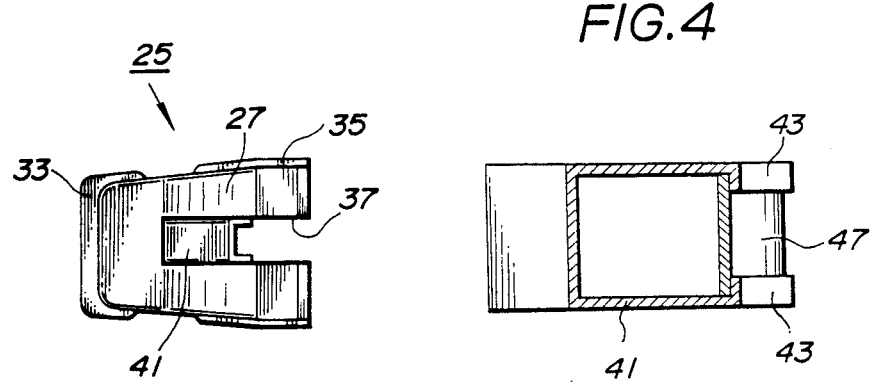
FIG. 3
FIG. 4

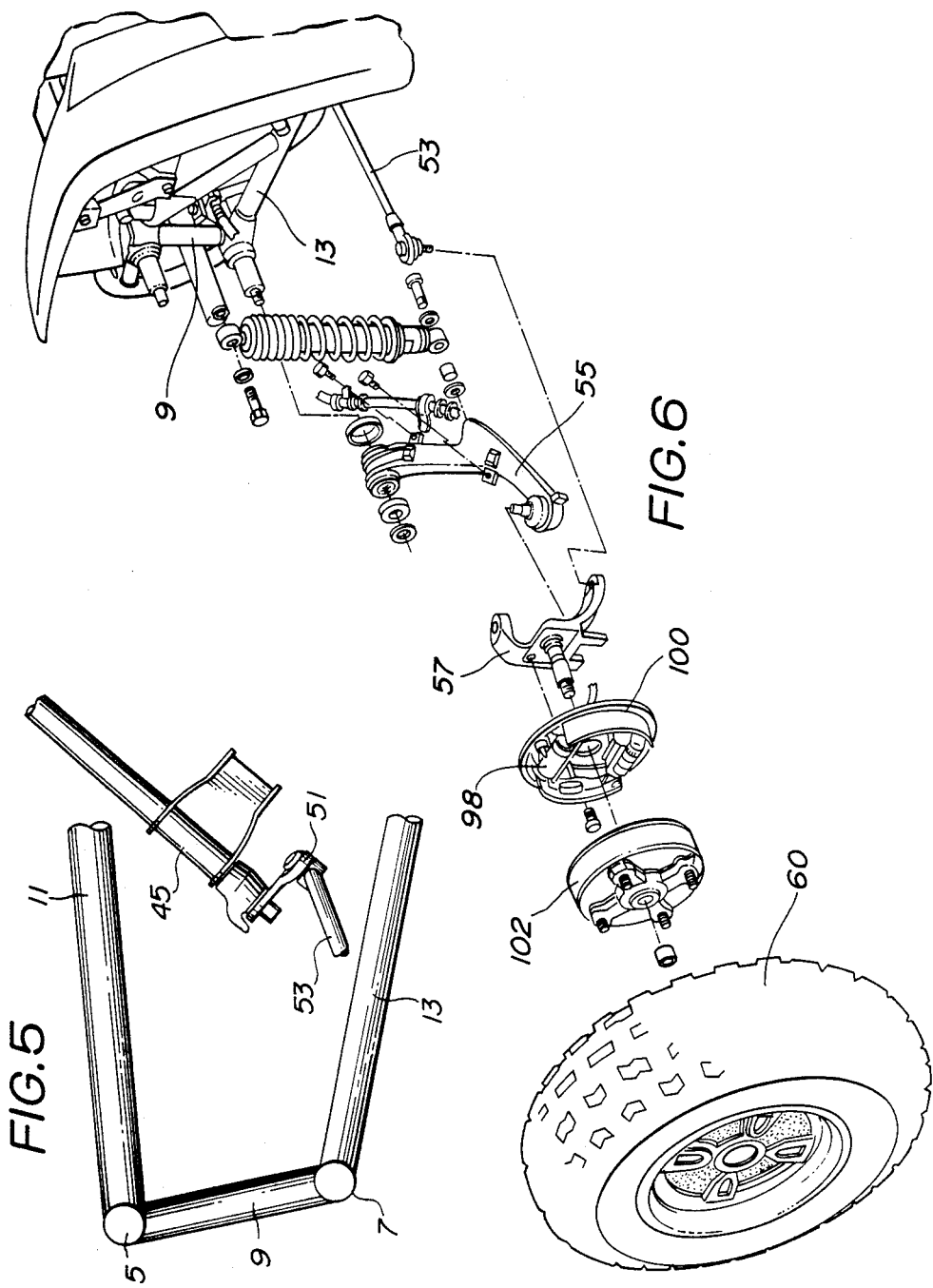

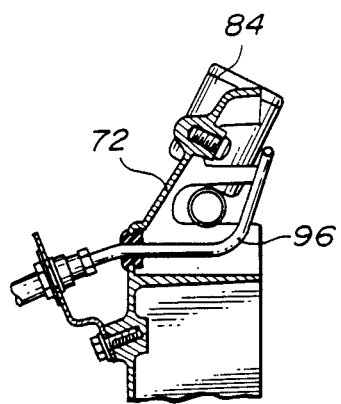
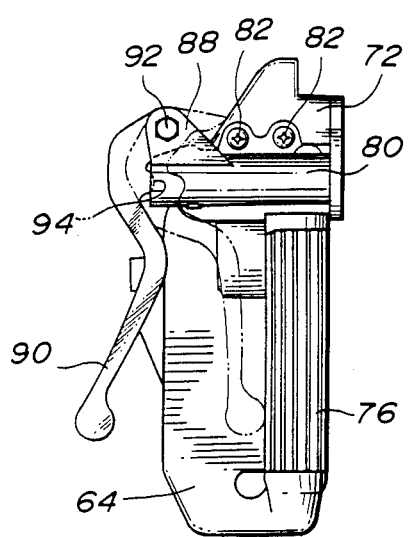
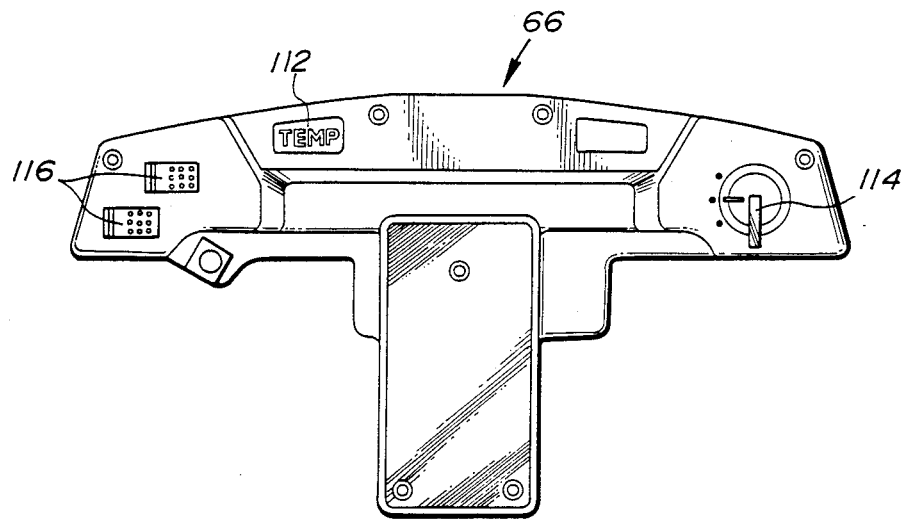

OFF-ROAD VEHICLE

BACKGROUND OF THE INVENTION

1. Field of the Invention

The present invention relates to an off-road vehicle.

2. Description of the Relevant Art

Off-road vehicles known as buggies have a hydraulic brake system which is operated by a brake operating assembly including a brake master cylinder, a brake oil reservoir, and other members. These components of the brake operating assembly are disposed below a steering shaft. Therefore, a brake lever mounted on a steering handle and the brake master cylinder should be operatively interconnected by a complex connecting mechanism including a plurality of links and rods.

Japanese Laid-Open Utility Model Publication No. 60/134042 discloses an off-road vehicle having a frame comprising a pair of laterally spaced support pipes extending substantially horizontally in the longitudinal direction of the vehicle, a pair of laterally spaced main pipes extending over the support pipes substantially parallel to each other, and a plurality of rectangularly assembled front pipes having distal ends interconnecting the support and main pipes. A floor panel is attached to a front portion of the frame, and a steering column extends through the floor panel to a position below the floor panel. To the lower distil end of the steering column, there is coupled a central steering arm connected to the inner ends of tie rods. Since the central steering arm projects of necessity considerably downwardly from the frame, it is necessary to have a guard pipe extending rearwardly and downwardly from a lower portion of the front pipes for protecting the central steering arm from obstacles on the road.

Japanese Laid-Open Utility Model Publication No. 51/109519 also discloses an off-road vehicle. In this and above earlier off-road vehicles, the floor panel has an opening through which the steering column extends. With this arrangement, however, the steering system can be maintained or serviced only after the steering column has been disconnected from the tie rods and removed, and then the floor panel has been detached from the frame. Therefore, the efficiency of maintenance has been low.

SUMMARY OF THE INVENTION

It is a primary object of the present invention to provide an off-road vehicle which has a simplified brake operating assembly and a reduced number of parts that are attained by locating a brake master cylinder and a brake oil reservoir of the brake operating assembly directly on a steering handle.

Another object of the present invention is to provide an off-road vehicle having a steering system that can be efficiently maintained or serviced.

According to the present invention, there is provided a combination steering handle and hydraulic brake operating assembly on an off-road vehicle, comprising a steering handle having a base, a rectangular handle portion integral with the base, and a cover covering the base, and a brake operating assembly having a brake oil reservoir, two brake levers pivotally supported on lateral sides of the handle portion for braking front and rear wheels, respectively, and two brake master cylinders communicating with the brake oil reservoir through hoses and responsive to operation of the brake levers for generating hydraulic pressure. The brake oil reservoir is centrally fixedly mounted on the rectangular handle portion, the brake master cylinders being fixedly mounted respectively on the lateral sides of the handle portion.

Since the brake levers, the brake master cylinders, and the brake oil reservoir are all mounted on the steering handle, it is not necessary to provide various link mechanisms and connecting rods which would otherwise be needed to couple the brake levers and the brake master cylinders.

According to the present invention, there is also provided an off-road vehicle comprising a frame assembly constructed of a plurality of pipes including at least one lateral pipe extending horizontally and transversely of the vehicle, two front wheel suspensions having respective knuckle arms, two front wheels rotatably supported respectively on the front wheel suspensions, two rear wheels rotatably supported on lateral sides of a rear portion of the frame assembly, an engine mounted on the rear portion of the frame assembly for driving the rear wheels, and a steering mechanism having a steering column supporting a central steering arm on a lower end thereof and a steering handle on an upper end thereof, and tie rods having first ends coupled to the central steering arm and second ends coupled to the knuckle arms, respectively. The central steering arm is located upwardly of the lateral pipe of the frame assembly.

The lateral pipe at the foremost end of the frame assembly is positioned downwardly of the central steering arm. Thus, the central steering arm is protected from obstacles on the road even without any guide pipe in front of the central steering arm.

According to the present invention, there is also provided an off-road vehicle comprising a pipe frame, two front wheels rotatably supported on lateral sides of a front portion of the pipe frame, two rear wheels rotatably supported on lateral sides of a rear portion of the pipe frame, an engine mounted on the rear portion of the pipe frame for driving the rear wheels, a floor panel mounted on the front portion of the pipe frame, and a steering mechanism having a steering column for steering the front wheels. The floor panel has a recess defined in a rear side thereof, and the steering column extends through the recess downwardly of the floor panel.

The floor panel can be dismounted from the frame without having to detaching the steering column from the other steering mechanism members. Consequently, maintenance of the vehicle, particularly the front wheel steering mechanism, can be easily effected.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 2 is an exploded perspective view of a front portion of the off-road vehicle shown in FIG. 1, with front wheels and other members being omitted from illustration for brevity;

FIG. 3 is a plan view of a floor panel shown in FIG. 2;

FIG. 4 is an enlarged fragmentary view showing an open rear portion of the floor panel with a central cover attached thereto;

FIG. 5 is an enlarged fragmentary view showing a central steering arm positioned above a lowest portion of a frame;

FIG. 6 is an exploded perspective view of a front wheel steering system and a brake system of the off-road vehicle shown in FIG. 1;

FIG. 9 is a cross-sectional view taken along line IX—IX of FIG. 7;

FIG. 10 is a side elevational view of the steering handle shown in FIG. 7; and

FIG. 11 is a front elevational view of a handle cover for use on the steering handle illustrated in FIG. 7.

DETAILED DESCRIPTION OF THE PREFERRED EMBODIMENT

Figure 1:
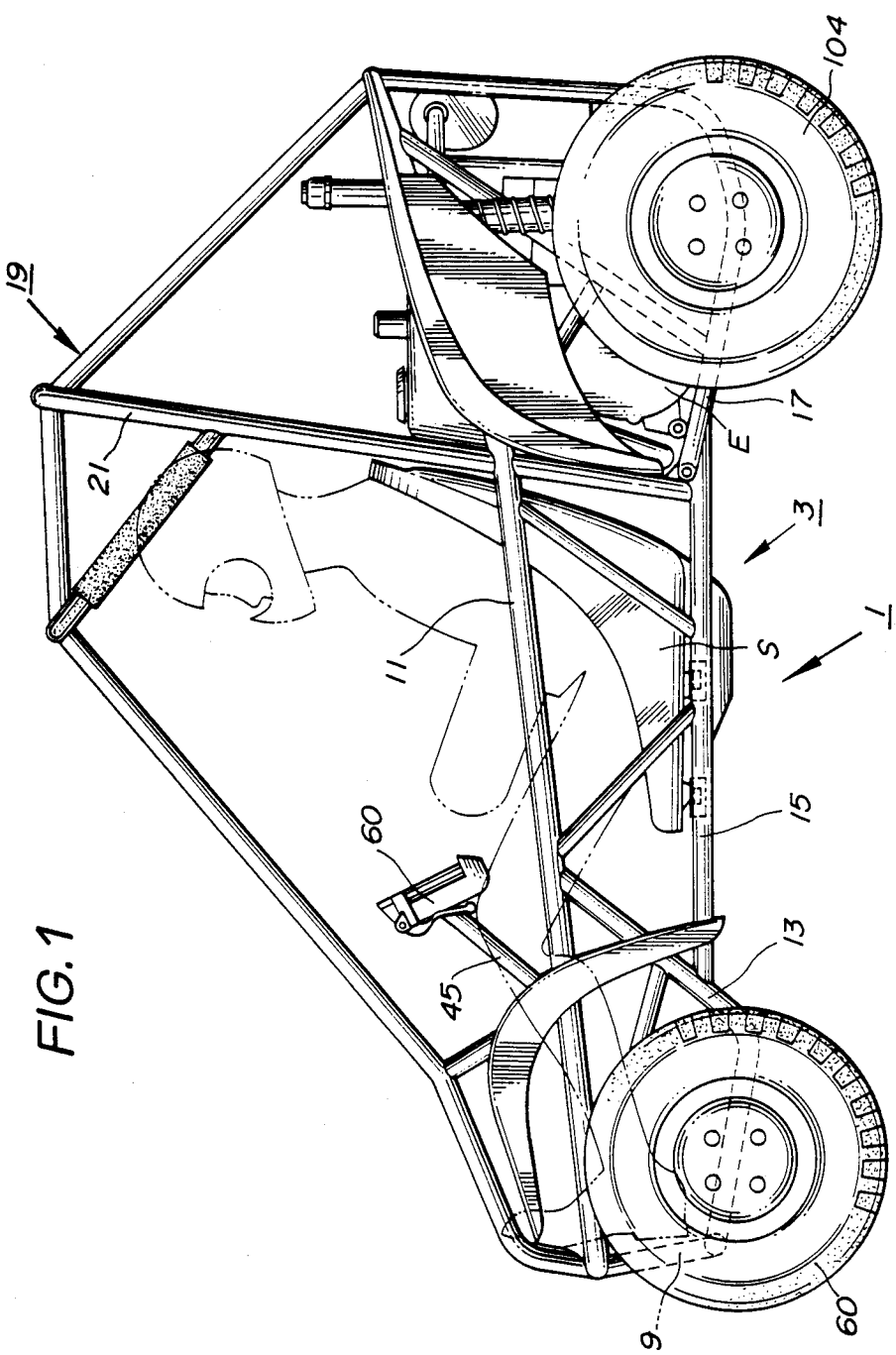
FIG. 1 is a side elevational view of an off-road vehicle according to the present invention.

As shown in FIGS. 1 and 2, an off-road vehicle 1 has a frame assembly generaly designated by the reference numeral 3. The frame assembly 3 comprises upper and lower lateral spaced pipes 5, 7 extending substantially parallel to each other in the transverse direction of the vehicle 1 and having opposite ends joined to two vertical pipes 9, and two laterally spaced main pipes 11 extending from the opposite ends of the upper lateral pipe 5 substantially horizontally in the longitudinal direction of the vehicle 1. Two laterally spaced front lower pipes 13 of a V shape have front ends connect4ed to the lower lateral pipe 7 at its opposite ends and rear ends coupled to the main pipes 11, respectively. A driver's seat S is supported on laterally spaced central lower pipes 15 which are joined to and extend between the front lower pipes 13 and the rear ends of the main pipes 11. An engine E for driving rear wehels is supported on laterally spaced rear lower pipes 17 which extend from rear portions of the central lower pipes 15 to the rear ends of the main pipes 11. Three roll bars 19 are coupled to the main pipes 11, the roll bars 19 including a central roll bar 21 positioned substantially centrally in the longitudinal direction of the vehicle 1.

As best shown in FIG. 2, a floor panel 25 is supported on a front portion of the main pipes 11. The floor panel 25 has a bottom plate 27 on which the driver can place his feet, and a front plate 29 and two side plates 31 which are erected integrally from the three sides of the floor panel 25 except for the side closest to the driver. Flanges 33, 35 project outwardly from the upper edges of the front and side plates 29, 31. The flanges 33, 35 are disposed respectively on the upper lateral pipe 5 and the main pipes 11. The bottom plate 27 has a recess 37 defined in a rear side thereof close to the driver. A steering column cover 41 is integrally erected from the peripheral edge of the rececess 37, the steering colum cover 41 having an open rear end (see also FIG. 3). The steering column cover 41 has triangular opposite side plates having rear ends from which bent flanges 43 (FIG. 4) project inwardly toward each other, the flanges 43 serving as attachment flanges. After a steering column 45 has been inserted into the steering column cover 41 through its open rear end, a central cover 47 is fastened to the front surfaces of the bent flanges 43 by bolts and nuts (not shown), thus closing the open rear end of the steering column cover 41.

As shown in FIG. 5, a central steering arm 51 is mounted on the lower distal end of the steering column 45, and the inner ends of two tie rods 53 are coupled to the opposite ends of the central steering arm 51. As illustrated in FIG. 6, knuckle arms 55 are swingably mounted on the respective outer ends of the tie rods 53. Each of the knuckle arms 55 supports a spindle 57 on which a wheel 60 is rotatably supported. Since the central steering arm 51 is disposed upwardly of the lower lateral pipe 7, the central steering arm 51 can be protected from obstacles on the road without any guard pipe or the like which would otherwise be attached to the frame assembly 3.

Figure 7:
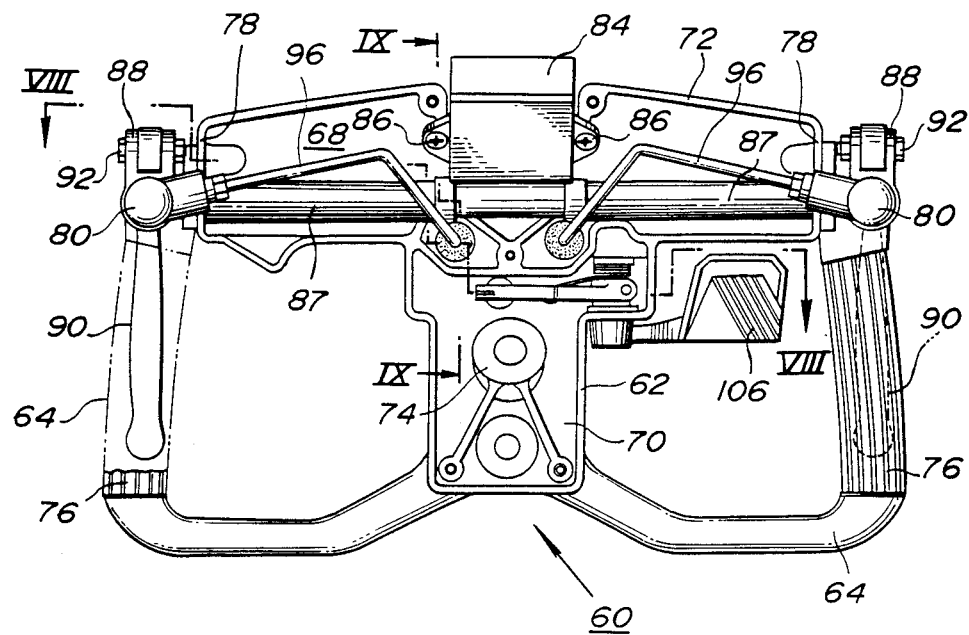
FIG. 7 is a front elevational view of a steering handle shown in FIG. 1, with a cover detached to show an internal structure of the steering handle.

As illustrated in FIG. 7, a steering handle 60 mounted on the upper end of the steering column 45 comprises a substantially T-shaped base 62 and a pair of laterally spaced, substantially L-shaped grips 64 integral with the base 62. Therefore, the steering handle 60 is of a substantially rectangular shape in its entirety. A handle cover 66 (FIG. 11) is attached to the upper surface of the base 62, the handle cover 66 being complementary in shape to the base 62. The handle cover 66 and the base 62 jointly define a housing space 68 therebetween. The base 62 comprises a central portion 70 and an upper portion 72. The central portion 70 has a boss 74 on its inner surface, and the upper end of the steering column 45 is coupled to the boss 74. Rubber covers 76 with vertical grooves defined on their outer surfaces are fitted over the grips 64, respectively. A rectangularly shaped steering handle is known from Japanese Laid-Open Utility Model Publication No. 56/56469.

Figure 8:
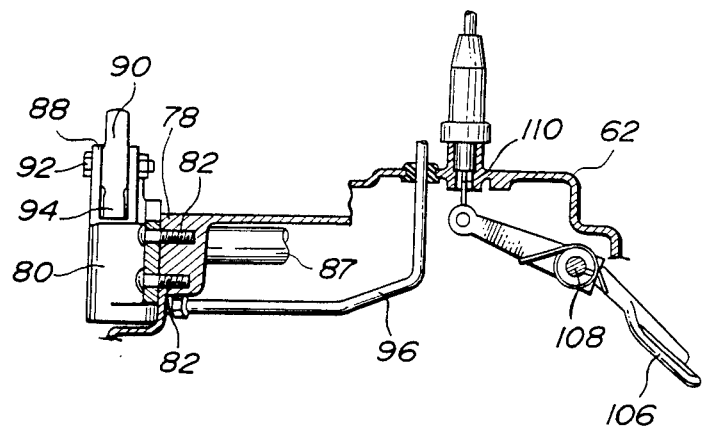
FIG. 8 is a cross-sectional view taken along line VIII—VIII of FIG. 7.

In the illustrated embodiment, two brake master cylinders 80 are mounted respectively on opposite ends 78 of the base 62 by means of screws 82 (FIG. 8). A brake oil reservoir 84 (FIGS. 7 and 9) is fixed to an upper central portion of the base 62 by means of screws 86 (FIG. 7). The brake oil reservoir 84 and the brake master cylinders 80 are coupled to each other by hoses 87 placed on the upper portion 72 of the base 62. Brackets 88 project from outer peripheral surfaces, respectively, of the brake master cylinders 80. Brake levers 90 for braking front and rear wheels are pivotaly mounted on the respective brackets 88 by means of bolts and nuts 92. Each of the brake master cylinders 80 houses a piston rod (not shown) and a piston (not shown) fixed to one end of the piston rod and slidable in the cylinder. The other end of the piston rod is normally urged to abut against a presser 94 projecting from the brake lever 90 under the bias of a spring (not shown) mounted in the brake master cylinder 80.

Operation of a front wheel brake system will be described below. When one brake lever 90 is angularly moved from the solid-line position to the broken-line position in FIG. 10, an oil pressure buildup is developed in the brake master cylinder 80 to open a check valve in the brake master cylinder 80 for forcing brake fluid or oil into one of two brake pipes 96. The brake pipes 96 have ends connected to the corresponding brake master cylinders 80 and the other ends connected to respective wheel cylinders 98 (FIG. 6). Thereafter, the braking oil in the brake pipe 96 flows into the wheel cylinder 98 which then apply hydraulic forces to spread a brake shoe 100 to press a brake lining against a brake drum 102 for thereby braking rotation of the front wheel 60. The structure and operation of a brake system for rear wheels 104 (FIG. 1) are substantially the same as those of the front wheel brake system as described aove, and hence will not be described.

Referring back to FIGS. 7 and 8, an accelerator lever 106 is pivotally mounted on the central portion 70 of the base 62 by a pivot shaft 108, and a throttle cable 110 is connected to one end of the accelerator lever 106.

As shown in FIG. 11, the substantially T-shaped handle cover 66 mounted on the top of the base 62 supports thereon various warning lamps and switches such as a water temperature warning lamp 112, an engine switch 114, and a light switch 116.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A combination steering handle and hydraulic brake operating assembly on an off-road vehicle, comprising:

a steering handle having a base, a rectangular handle portion integral with said base, and a cover covering said base;

a brake operating assembly having a brake oil reservoir, two brake levers pivotally supported on lateral sides of said handle portion for braking front and rear wheels, respectively, and two brake master cylinders communicating with said brake oil reservoir through hoses and responsive to operation of said brake levers for generating hydraulic pressure;

said brake oil reservoir being centrally fixedly mounted on said rectangular handle portion; and said brake master cylinders being fixedly mounted respectively on said lateral sides of said handle portion.

2. A combination steering handle and hydraulic brake operating assembly according to claim 1, wherein said brake levers are pivotally supported respectively on said brake master cylinders.

3. A combination steering handle and hydraulic brake operating assembly according to claim 1, wherein said hoses are housed in an upper portion of said handle portion.

* * * * *

UNITED STATES PATENT AND TRADEMARK OFFICE
CERTIFICATE OF CORRECTION

PATENT NO. : 4,836,325

DATED : June 6, 1989

INVENTOR(S) : Enokimoto et al.

It is certified that error appears in the above-identified patent and that said Letters Patent is hereby corrected as shown below:

Column 2, line 49, change "detaching" to --detach--.

Column 3, line 34, change "connect4ed" to --connected--.
         line 41, change "wehels" to --wheels--.
         line 60, change "rececess" to --recess--.

Column 4, line 44, change "pivotaly" to --pivotally--.

Column 5, line 1, change "aove" to --above--.

Signed and Sealed this

Twenty-sixth Day of June, 1990

Attest:

HARRY F. MANBECK, JR.

Attesting Officer

Commissioner of Patents and Trademarks